E. B. CUSHMAN.
AGRICULTURAL MACHINE.
APPLICATION FILED MAY 23, 1913.
1,082,847.
Patented Dec. 30, 1913.
2 SHEETS—SHEET 1.
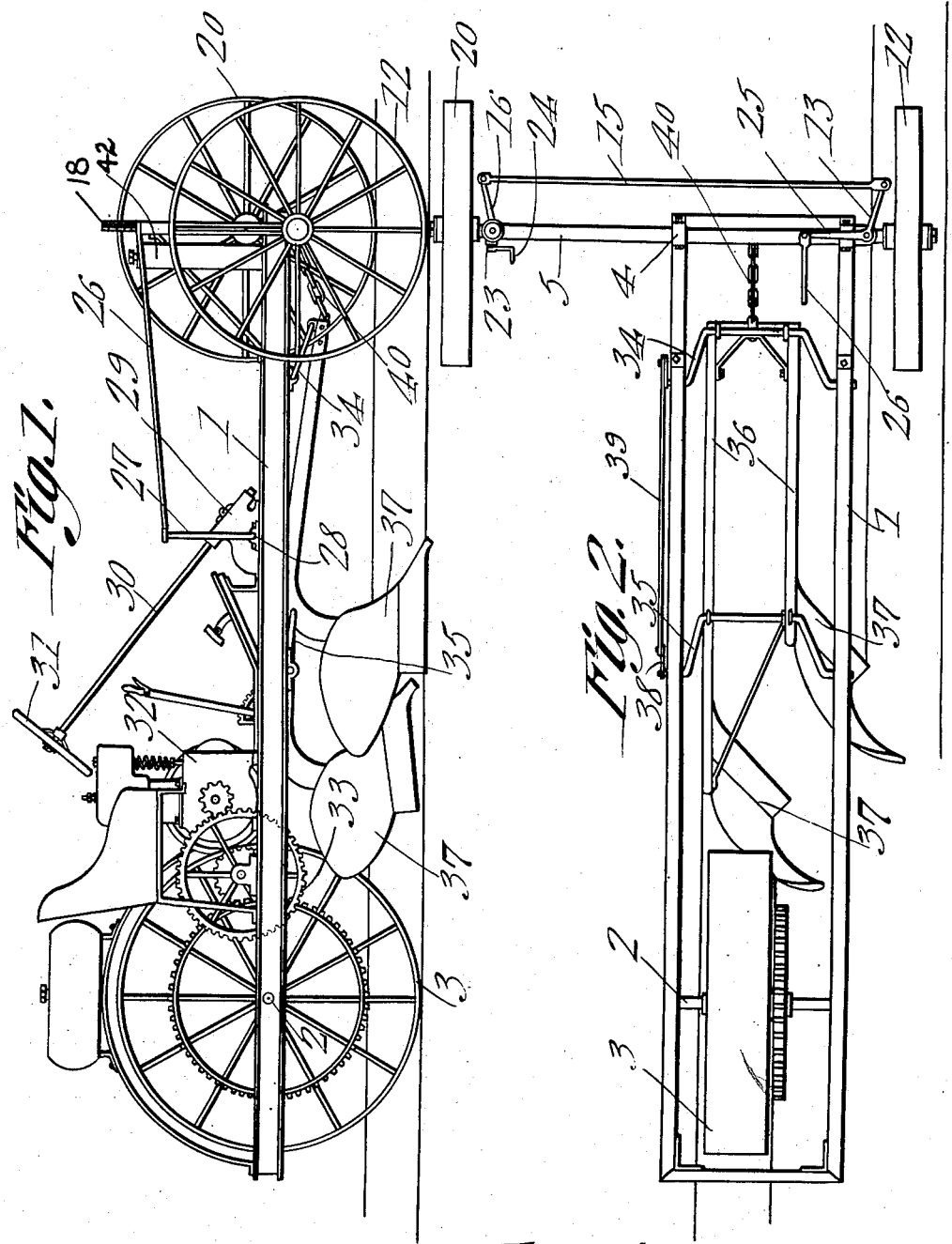
Witnesses
E. B. Cushman, Inventor
by C. A. Snow & Co.
Attorneys

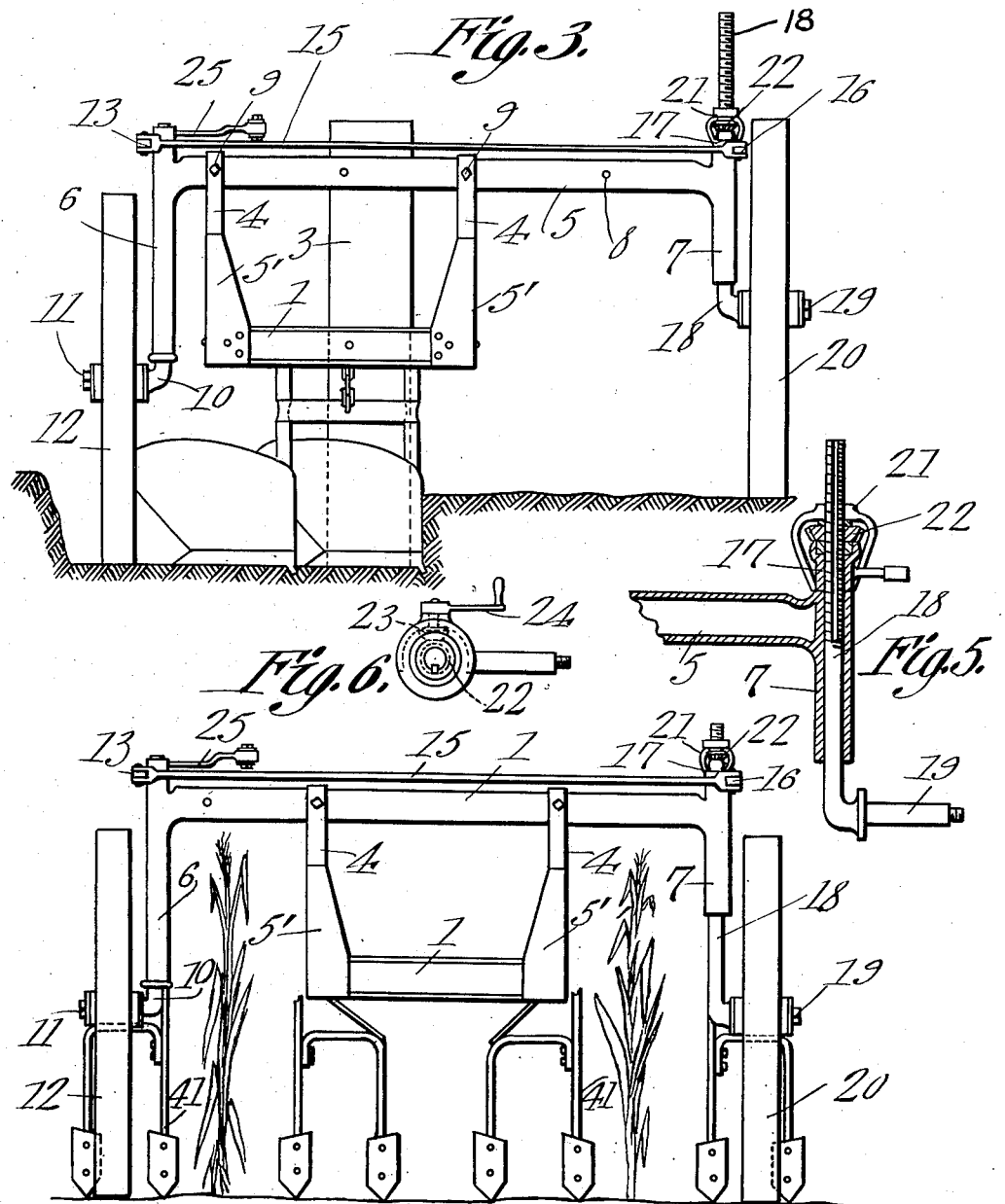

UNITED STATES PATENT OFFICE.

EVERETT B. CUSHMAN, OF LINCOLN, NEBRASKA.

AGRICULTURAL MACHINE.

1,082,847.  Specification of Letters Patent.  Patented Dec. 30, 1913.

Application filed May 23, 1913. Serial No. 769,525.

*To all whom it may concern:*

Be it known that I, EVERETT B. CUSHMAN, a citizen of the United States, residing at Lincoln, in the county of Lancaster and State of Nebraska, have invented a new and useful Agricultural Machine, of which the following is a specification.

This invention relates to agricultural machines, one of its objects being to provide a motor propelled structure capable of being used as a tractor and which also constitutes means for supporting soil engaging devices for use in the cultivation of the soil.

A further object is to provide a machine of this character having its parts so arranged that, while the machine is plowing, two of the wheels of the machine will travel in the furrow while a third wheel, which is capable of vertical adjustment, will travel on the unplowed soil.

Another object is to provide a machine having a front arched axle which can be adjusted relative to the body of the machine so as to arch over two rows of standing corn, etc., when the machine is used in cultivating the rows, the drive wheel traveling between the rows.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.
In said drawings: Figure 1 is a side elevation of the machine, the plow and two of the wheels being shown in a furrow. Fig. 2 is a plan view of the machine the radiator being removed. Fig. 3 is a front elevation. Fig. 4 is a similar view showing the axle adjusted to a different position and showing cultivator teeth in certain of the positions which they may assume relative to the supporting wheels. Fig. 5 is an enlarged sectional view of the means employed for adjusting the land wheel vertically. Fig. 6 is a plan view of said adjusting means.

Referring to the figures by characters of reference 1 designates the frame of the machine, the same being preferably long and narrow as shown particularly in Fig. 2 and being provided, adjacent its rear end, with an axle 2 which is supported by the drive wheel 3. The front end of the frame has boxes 4 through which extends the long front axle 5 provided, at its ends, with tubular depending arms 6 and 7. Axle 5 is provided with transverse openings 8 and the boxes 4, which are preferably carried by hangers 5' connected to the frame 1, have bolts 9 adapted to be extended through certain of the openings 8 and thus not only prevent the axle from rotating relative to the frame 1 but also to prevent it from shifting longitudinally or, in other words, in the direction of the length of the axle.

Mounted for rotation in the tubular arm 6 is a stem 10 having a laterally extending spindle 11 at its lower end on which the front furrow wheel 12 is journaled. The upper end of this stem 10 has an arm 13 extending forwardly therefrom and connected, by a cross rod 15, to a similar arm 16 extending forwardly from a block 17 through which extends a threaded stem 18 slidably mounted in the arm 7 and provided at its lower end with a spindle 19 engaging the land wheel 20. The stem 18 is feathered in the block 17 and slides within a guide bracket 21 secured to and revoluble with block 17. A gear 22 is fitted within bracket 21 so as to be held against up and down movement by the bracket and the block 17 respectively and this gear is engaged by the threads on the stem 18. Gear 22 may be rotated in any suitable manner, as by means of a small bevel gear 23 which can be rotated in any desired manner, as by means of a crank arm 24. Obviously when this crank arm is rotated, the gears will be revolved and the stem 18 thus caused to slide upwardly or downwardly as desired within the arm 7. Thus the land wheel 20 can be adjusted vertically.

An arm 25 is connected to the upper end of stem 10 and has a rearwardly extending rod 26 attached to it and to an arm 27 which extends upwardly from a transverse shaft 28. This transverse shaft is adapted to be rotated by any suitable mechanism provided for that purpose, said mechanism being preferably housed in a casing 29. As this mechanism does not constitute any part of the present invention, it has not been deemed necessary to illustrate it. It might be stated however, that the mechanism is preferably actuated by means of a steering post 30 having a hand wheel 31.

The motor used in propelling the machine is preferably located back of the center of the machine, as shown at 32 and the mechanism utilized for transmitting motion from this motor to the drive wheel 3 can be of any form desired. In the structure illustrated the driving mechanism has been indicated generally at 33. A radiator has been shown at 42 in Fig. 1.

Any suitable means may be provided for connecting plows to the frame 1. For example, and as shown in Figs. 1 and 2, front and back transverse crank shafts 34 and 35 may be connected to the frame, these crank shafts being engaged by beams 36. The plows 37 are connected to the rear end portions of the beams and the two crank shafts 35 have crank arms 38 connected by a bar 39 so that the shafts will be caused to rotate together. Thus, when the front ends of the beams 36 are elevated by rotating shaft 34, the rear portions of said beams will be correspondingly elevated in view of the fact that bar 39 will likewise cause shaft 35 to rotate. A draw chain 40 or the like may connect the front end of the frame 1 to the front crank shaft 34 so as to limit the rearward and downward swinging movement of the plow beams. It will be noted that the plows are supported directly in front of the drive wheel 3 so that the furrow produced by them will receive this drive wheel.

In view of the fact that the front axle 5 is adjustable within the boxes 4, it will be apparent that the furrow wheel 12 can be adjusted so as to travel within the furrow being formed while the land wheel 20 can be brought to a position where it will travel upon the unplowed soil.

While the machine is particularly designed for plowing, it will be apparent that, if desired, cultivator shovels or teeth, such as shown at 41 in Fig. 4, can be substituted for the plows. When such cultivating shovels are employed, the wheel 20 is of course adjusted so as to travel on the same level with the wheels 12 and 3 and the axle 5 is adjusted so as to extend equal distances beyond both sides of the frame 1, as shown in Fig. 4, thus arching over two rows, the drive wheel traveling between the rows.

When the machine is not being used for plowing or cultivating, in the manner described, it can be employed for pulling machinery and, by leaving the structure stationary, the motor thereof can be employed for driving various stationary machines.

It will be noted that the frame 1 is so proportioned as to travel readily between two adjoining rows of corn or the like. Thus it is possible to support this frame close to the ground so that the machine will not be rendered top heavy and be overturned easily. The front end of the frame extends under and is hung from the front arched axle, thus permitting this arched axle to be made of any height sufficient to allow it to pass over two adjoining rows, between which the frame 1 is traveling. By having the frame 1 supported close to the ground, the machine is not only prevented from overturning readily but it becomes possible to use a smaller and, consequently, more powerful drive wheel 3 and to exert a more direct forward thrust against the plows or other soil engaging devices connected to the machine. Furthermore as the frame is supported close to the ground, the operator can more readily get on and off the machine than would be possible should the frame be supported at a sufficient height to permit it to pass over the standing rows.

What is claimed is:—

1. An agricultural machine including a body, a drive wheel supporting the rear end of the body close to the ground, means on the body for driving the wheel to propel the body, and an arched axle extending over and supporting the front end of the body, said axle being arranged above and laterally beyond the sides of the body.

2. In an agricultural machine, a body of a width less than the distance between two adjoining rows to be cultivated, a drive wheel supporting the rear end of the body close to the ground, means on the body for driving the wheel to propel the body between two adjoining standing rows, and an arched axle supporting the front end of the body, said axle being adapted to straddle the adjoining rows between which the body is movable.

3. An agricultural machine including a body, a drive wheel supporting the rear portion of the body close to the ground, an arched axle extending over and spaced from the front portion of the body and extending laterally beyond the sides of the body, and hangers suspended from the axle and secured to the front portion of the body to support said portion close to the ground.

4. An agricultural machine including a body, a drive wheel supporting the rear portion of the body close to the ground, an arched axle extending over and spaced from the front portion of the body and extending laterally beyond the sides of the body, and hangers suspended from the axle and secured to the front portion of the body to support said portion close to the ground, said hangers being adjustable longitudinally of the arched axle.

5. An agricultural machine including a body, a drive wheel supporting the rear portion of the body close to the ground, an arched axle extending over and spaced from the front portion of the body and extending laterally beyond the sides of the body, hangers suspended from the axle and secured to the front portion of the body to support said portion close to the ground, and soil engaging devices mounted within the body.

In testimony that I claim the foregoing as my own, I have hereto affixed my signature in the presence of two witnesses.

EVERETT B. CUSHMAN.

Witnesses:
 GRACE E. MILLS,
 E. B. STILSON.